(12) United States Patent
Wu et al.

(10) Patent No.: US 9,251,240 B2
(45) Date of Patent: *Feb. 2, 2016

(54) SYSTEM, METHOD AND COMPUTER PROGRAM PRODUCT FOR PORTAL USER DATA ACCESS IN A MULTI-TENANT ON-DEMAND DATABASE SYSTEM

(75) Inventors: Yongsheng Wu, Redwood City, CA (US); Alfred Vieira, Oakland, CA (US); Punit Jain, Cupertino, CA (US)

(73) Assignee: salesforce.com, inc., San Francisco, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 13/448,278

(22) Filed: Apr. 16, 2012

(65) Prior Publication Data

US 2012/0203800 A1   Aug. 9, 2012

Related U.S. Application Data

(63) Continuation of application No. 13/292,036, filed on Nov. 8, 2011, now Pat. No. 9,002,891, and a continuation of application No. 13/292,043, filed on Nov. 8, 2011, now Pat. No. 8,996,574, said application No. 13/292,036 is a continuation of application No. 13/078,858, filed on Apr. 1, 2011, said application No. 13/292,043 is a continuation of application No. 13/078,858.

(60) Provisional application No. 61/320,152, filed on Apr. 1, 2010, provisional application No. 61/320,188, filed on Apr. 1, 2010.

(51) Int. Cl.
*G06F 17/30* (2006.01)
*G06F 21/62* (2013.01)

(52) U.S. Cl.
CPC ...... *G06F 17/30595* (2013.01); *G06F 21/6209* (2013.01); *G06F 2221/2117* (2013.01); *G06F 2221/2119* (2013.01); *G06F 2221/2143* (2013.01)

(58) Field of Classification Search
CPC .................. G06F 17/30595; G06F 2221/2117; G06F 2221/2119
USPC .................................................. 707/784, 805
See application file for complete search history.

(56) References Cited

U.S. PATENT DOCUMENTS 5,577,188 A   11/1996   Zhu et al.
5,608,872 A   3/1997   Schwartz et al.
(Continued)

OTHER PUBLICATIONS

U.S. Appl. No. 60/828,192, filed Oct. 4, 2006.
(Continued)

*Primary Examiner* — Shew-Fen Lin
(74) *Attorney, Agent, or Firm* — Zilka-Kotab, PC

(57) ABSTRACT

In accordance with embodiments, there are provided mechanisms and methods for portal user data access in a multi-tenant on-demand database system. These mechanisms and methods for portal user data access in a multi-tenant on-demand database system can enable embodiments to provide portal-specific user accounts to the multi-tenant on-demand database system which have reduced configuration requirements than users directly accessing the multi-tenant on-demand database system. The ability of embodiments to provide portal-specific user accounts can reduce processing requirements of the database system.

15 Claims, 9 Drawing Sheets

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,823,384 B1 * | 11/2004 | Wilson et al. | 709/225 |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,181,758 B1 | 2/2007 | Chan | |
| 7,209,929 B2 | 4/2007 | Dominguez, Jr. et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,370,364 B2 * | 5/2008 | Dobbins et al. | 726/28 |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,698,160 B2 | 4/2010 | Beaven et al. | |
| 7,779,039 B2 | 8/2010 | Weissman et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,095,618 B2 * | 1/2012 | Lewis et al. | 709/213 |
| 8,275,836 B2 | 9/2012 | Beaven et al. | |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 * | 10/2005 | Weissman et al. | 707/102 |
| 2005/0283478 A1 | 12/2005 | Choi et al. | |
| 2006/0021019 A1 | 1/2006 | Hinton et al. | |
| 2006/0123234 A1 * | 6/2006 | Schmidt et al. | 713/168 |
| 2006/0206834 A1 | 9/2006 | Fisher et al. | |
| 2008/0082540 A1 * | 4/2008 | Weissman et al. | 707/9 |
| 2008/0082555 A1 * | 4/2008 | Salmon et al. | 707/100 |
| 2008/0098486 A1 | 4/2008 | Lin et al. | |
| 2008/0133413 A1 | 6/2008 | Bennett et al. | |
| 2008/0249972 A1 | 10/2008 | Dillon | |
| 2009/0063415 A1 | 3/2009 | Chatfield et al. | |
| 2009/0089625 A1 * | 4/2009 | Kannappan et al. | 714/39 |
| 2009/0100342 A1 | 4/2009 | Jakobson | |
| 2009/0177744 A1 | 7/2009 | Marlow et al. | |
| 2010/0017415 A1 * | 1/2010 | Kurumai et al. | 707/10 |
| 2010/0049637 A1 * | 2/2010 | Laventman et al. | 705/30 |
| 2010/0115113 A1 * | 5/2010 | Short et al. | 709/228 |
| 2010/0125612 A1 * | 5/2010 | Amradkar et al. | 707/802 |

(56) References Cited

U.S. PATENT DOCUMENTS

| | | |
|---|---|---|
| 2010/0198370 A1 | 8/2010 | Salsbury |
| 2010/0198730 A1* | 8/2010 | Ahmed et al. ............. 705/50 |
| 2010/0306393 A1* | 12/2010 | Appiah et al. ............ 709/229 |
| 2011/0153684 A1* | 6/2011 | Yung ...................... 707/805 |
| 2011/0218958 A1 | 9/2011 | Warshavsky et al. |
| 2011/0247051 A1 | 10/2011 | Bulumulla et al. |
| 2011/0257994 A1* | 10/2011 | Givens et al. ............. 705/2 |
| 2012/0042218 A1 | 2/2012 | Cinarkaya et al. |
| 2012/0296977 A1* | 11/2012 | Ellison et al. ............ 709/204 |
| 2013/0198184 A1 | 8/2013 | Wu et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

OTHER PUBLICATIONS

Non-Final Office Action from U.S. Appl. No. 13/078,858, dated Jul. 17, 2012.

Non-Final Office Action from U.S. Appl. No. 13/292,043, dated Jul. 17, 2012.

Non-Final Office Action from U.S. Appl. No. 13/292,036, dated Jul. 17, 2012.

Non-Final Office Action from U.S. Appl. No. 13/797,784, dated Jul. 29, 2014.

Final Office Action from U.S. Appl. No. 13/797,784, dated Dec. 15, 2014.

* cited by examiner

LPU Access Mappings

SYSTEM, METHOD AND COMPUTER PROGRAM PRODUCT FOR PORTAL USER DATA ACCESS IN A MULTI-TENANT ON-DEMAND DATABASE SYSTEM

CLAIM OF PRIORITY

This application is a continuation of U.S. application Ser. No. 13/292,036, filed Nov. 8, 2011, and U.S. application Ser. No. 13/292,043, filed Nov. 8, 2011, which are continuations of U.S. application Ser. No. 13/078,858, filed Apr. 1, 2011, which claims the benefit of U.S. Provisional Patent Application 61/320,152 entitled "METHOD AND SYSTEM FOR GROUP MEMBERSHIP MAINTENANCE AND RECORD ACCESS FOR HIGHLY SCALABLE PORTAL USER SYSTEM," by Wu et al., filed Apr. 1, 2010, and U.S. Provisional Patent Application 61/320,188 entitled "METHOD AND SYSTEM FOR AN IMPLICIT SHARING MODEL FOR HIGHLY SCALABLE PORTAL USER SYSTEM," by Wu et al., filed Apr. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to user access in database environment.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database system, users access data in the database via an account of the user with the database. The account typically includes login information for verifying the user with the database system, and may further include permissions for indicating data of the database system that the user is allowed to access. Unfortunately, implementations of user accounts in conventional database systems have been limited.

For example, conventional database systems store only a single type of user account. Accordingly, each user account of the database system is generally configured according to the same types of data, and data access by users having the user account is generally processed in the same manner. This unfortunately does not allow for users of different types which may require different levels of configurations, etc. Just by way of example, users which may not necessarily require the same extent of configurations, permissions, etc. may still be limited to having a type of user account that is the same for other users requiring the configurations, permissions, etc.

Accordingly, it is desirable to provide techniques enabling the generation of user accounts in a database system having reduced configurations, permissions, etc. to reduce processing requirements of the database system.

BRIEF SUMMARY

In accordance with embodiments, there are provided mechanisms and methods for portal user data access in a multi-tenant on-demand database system. These mechanisms and methods for portal user data access in a multi-tenant on-demand database system can enable embodiments to provide portal-specific user accounts to the multi-tenant on-demand database system which have reduced configuration requirements than users directly accessing the multi-tenant on-demand database system. The ability of embodiments to provide portal-specific user accounts can reduce processing requirements of the database system.

In an embodiment and by way of example, a method for portal user data access in a multi-tenant on-demand database system is provided. In use, a user object associated with a user having access to a multi-tenant on-demand database system via a portal associated with the multi-tenant on-demand database system is stored. Additionally, the user object is referenced in at least one data object of the multi-tenant on-demand database system. Furthermore, access to the data object of the multi-tenant on-demand database system is provided, based on the reference.

While one or more implementations and techniques are described with reference to an embodiment in which portal user data access in a multi-tenant on-demand database system is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3C illustrates a GUI for defining a name and description for a sharing set to be used in providing object access to portal users, in accordance with the method of FIG. 3A;

FIG. 3D illustrates a GUI for associating a portal user profile to the sharing set, in accordance with the method of FIG. 3A;

FIG. 3E illustrates a GUI for associating a data object to the sharing set, in accordance with the method of FIG. 3A;

FIG. 3F illustrates a GUI presenting an access mapping for data objects, in accordance with the method of FIG. 3A;

DETAILED DESCRIPTION

General Overview

Systems and methods are pr vided for portal user data access in a multi-tenant on-demand database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing portal user data access in a multi-tenant on-demand database system will be described with reference to example embodiments.

Figure 1:
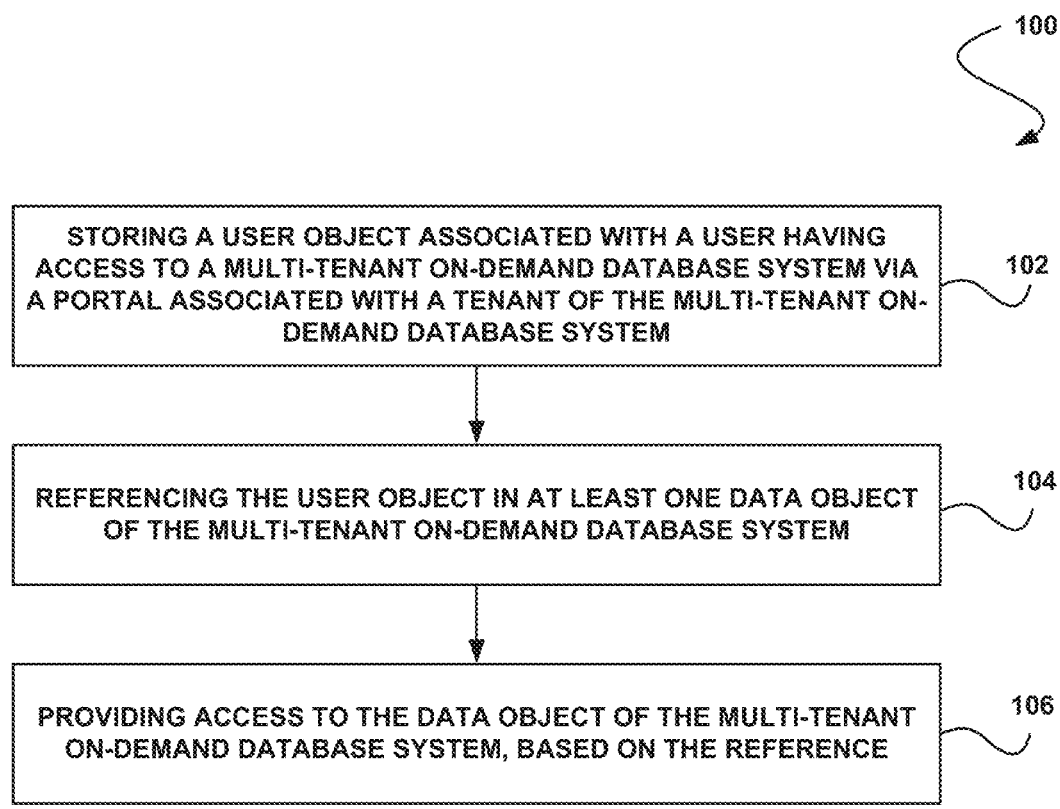
FIG. 1 illustrates a method for portal user data access in a multi-tenant on-demand database system, in accordance with an embodiment.

FIG. 1 illustrates a method 100 for portal user data access in a multi-tenant on-demand database system, in accordance with an embodiment. As shown in operation 102, a user object associated with a user having access to a multi-tenant on-demand database system via a portal associated with the multi-tenant on-demand database system is stored. In the context of the present description, the portal may include any interface which redirects the user to the multi-tenant on-demand database system. For example, the user may indirectly accesses the multi-tenant on-demand database system via the web interface.

In one embodiment, the portal may include a web interface which is specific to a tenant (e.g. customer) of the multi-tenant on-demand database system. For example, the multi-tenant on-demand database system may configure the web interface to be customized (e.g. branded) for the tenant. In this way, the user may appear to be accessing a site of the tenant when actually accessing a customized site provided for the tenant by the multi-tenant on-demand database system. In another embodiment, the user may access the multi-tenant on-demand database system via the portal, whereas the tenant may include an internal user which directly accesses the multi-tenant on-demand database system (e.g. via a web interface customized for the multi-tenant on-demand database system).

As noted above, the multi-tenant on-demand database system stores a user object associated with the user. The user object may include an object used by the user for accessing the portal. For example, the user object may store login information for use in authorizing a login to the portal by the user. Of course, the user object may also store various profile information (e.g. demographic, historical activity, etc.) associated with the user, as an option.

It should be noted that similarly, the internal user noted above may also have an internal user object stored by the multi-tenant on-demand database system. Such internal user object may be used by the internal user for directly accessing the multi-tenant on-demand database system. For example, the internal user object may store login information for use in authorizing a login to the multi-tenant on-demand database system by the internal user. To this end, in order to access the multi-tenant on-demand database system either directly or indirectly (i.e. via the portal), any type of user may be required to have an associated type of user object stored by the multi-tenant on-demand database system. As an option, the user object may be created upon a registration of the user with the portal/multi-tenant on-demand database system.

Additionally, as shown in operation 104, the user object is referenced in at least one data object of the multi-tenant on-demand database system. In the context of the present description, the data object may include any object (e.g. record, etc.) stored by the multi-tenant on-demand database system which is at least potentially capable of being accessed by the user. Thus, the data object may store data that is at least potentially accessible to the user. For example, the data object may be accessible to the user based on permissions for the user to access the data object, as described in more detail below.

As an option, the data object may be owned (e.g. and therefore managed) by a tenant of the multi-tenant on-demand database system. Just by way of example, the tenant may have created the data object. As another example, the data object may have been assigned to the tenant. Such ownership may optionally be indicated by virtue of a unique identifier of the tenant being stored in a field of the data object used for indicating an owner of the data object. It should be noted that the tenant may include the same or different tenant as the tenant associated with the portal via which the user accesses the multi-tenant on-demand database system.

In one embodiment, the user object may be directly referenced in the data object. Just by way of example, the user object may store a unique identifier of the user object. The user object may then be referenced by the data object by storing the unique identifier of the user object in the data object. Optionally, the unique identifier of the user object may be stored in a field of the data object which is configured to store identifiers of user objects to indicate that users of such user objects are allowed to access the data object.

In another embodiment, the user object may be indirectly referenced in the data object. As an option, a unique identifier of a contact object (representing a contact) may be stored in the user object for relating the user object with the contact object. Further, the user object may be referenced by the data object by storing the unique identifier of the contact object in the data object. As yet another option, a unique identifier of an account object (representing an account) may be stored in the contact object for relating the contact object with the account object, and the user object may be referenced by the data object by storing the unique identifier of the account object in the data object. By using the unique identifier of an account object as described above, access to the data object may be granted to all of the portal users associated with that account object. However, by using the unique identifier of a contact object which may be associated with a unique portal user, as described above, access to the data object may optionally only be granted to the unique portal user.

Still yet, the user object may be referenced in the data object in response to a manual request for an administrator of the tenant owning the data object. As another option, the user object may be referenced in the data object automatically in response to a determination that the user owns the data object. In yet another embodiment, the user object may be referenced in the data object automatically in response to a determination that the data object is of a public type (e.g. access permissions for the data object are set to public).

Furthermore, as shown in operation 106, access to the data object of the multi-tenant on-demand database system is provided, based on the reference. For example, if the data object includes the reference to the user object, then the user may be allowed to access the data object. As another example, if the data object does not include the reference to the user object, then the user may be denied access to the data object.

To this end, when a user attempts to access the data object (for example via a query for the data object associated with requesting a list, performing a search, running a report, viewing a record, etc.), it may be determined whether the user is authorized to access the data object. In particular, it may be determined whether the user object is referenced by the data object. Access to the data object, for example by returning the data object in a query result, may optionally only be granted when the user object is referenced by the data object. It should be noted that the access to the data object may include reading the data object, writing to the data object, deleting the data object, etc.

By conditionally providing a user access to data objects based on a reference in the data object of a user object associated with the user, an amount of processing required for determining whether the user is allowed access to the data object may be minimal. For example, use of group membership properties and/or relationship hierarchies for determining data object access may be avoided. In one embodiment, including the user object in a group and referencing the group in the data object for use in granting/denying user access to data objects may be avoided, such that a determination of whether the user associated with the user object is allowed access to the data object (which involves first processing the group to identify all the user objects allowed access to the data object and second comparing the user object of the user requesting access with those identified user objects to determine whether the user is allowed to access the data object) may be avoided.

To this end, a type of the user object may be different from a type of user object used for internal users of the multi-tenant on-demand database system (i.e. which are configured using the aforementioned group memberships). This may allow the multi-tenant on-demand database system to provide multiple different types of user objects, where the type of user object associated with a user is dependent on the manner in which the user is allowed to access the multi-tenant on-demand database system (i.e. directly or indirectly via the portal). For example, portal users [hereinafter referred to as light portal users (LPUs)] may be associated with user objects granted permission to access data objects in the manner described above with respect to the method 100 of FIG. 1, whereas internal users may be associated with a different type of user objects storing group membership information, etc. (and thus requiring additional processing for determining permissions to access data objects).

Figure 2:
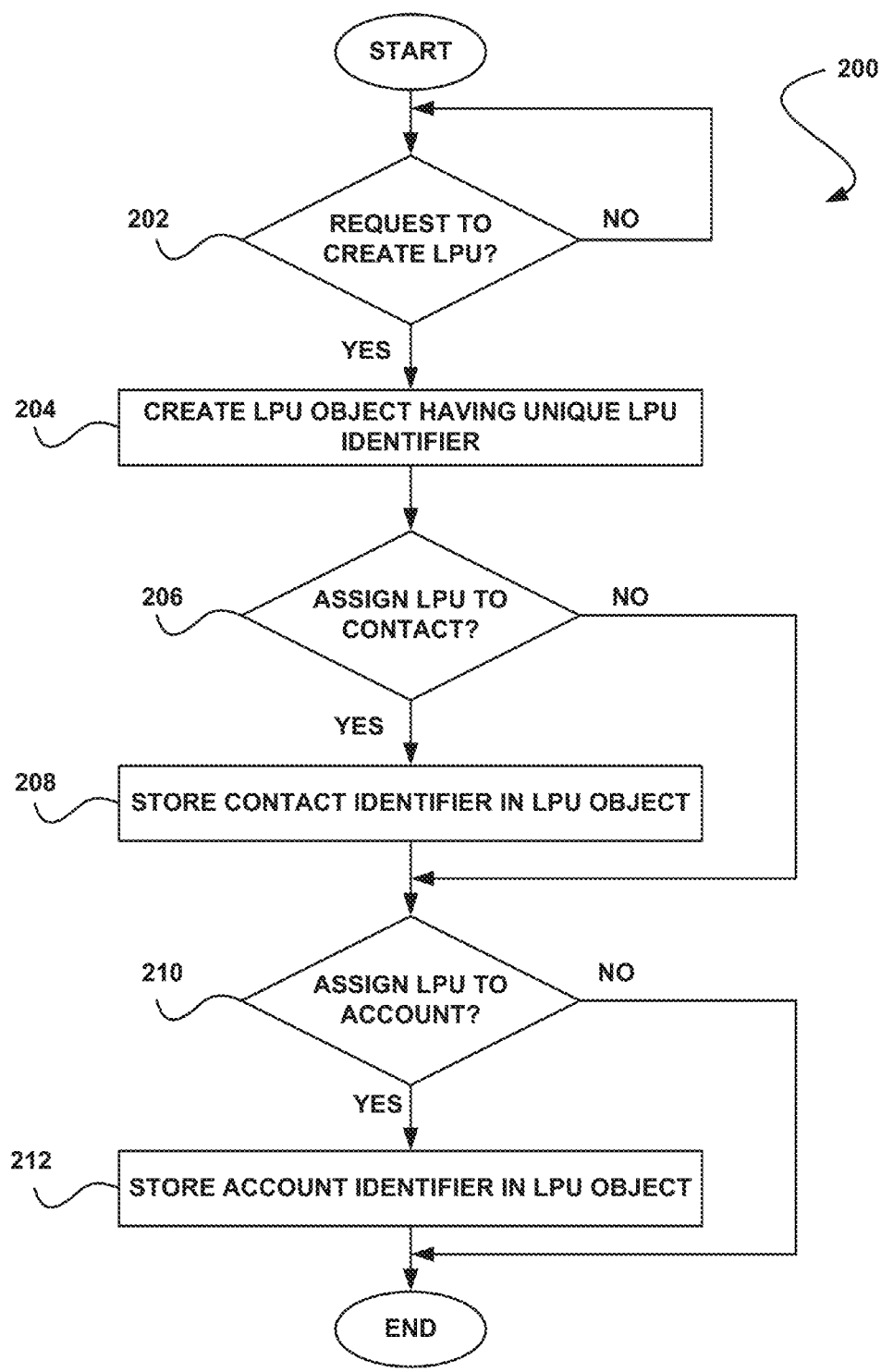
FIG. 2 illustrates a method for creating a portal user account, in accordance with an embodiment.

FIG. 2 illustrates a method 200 for creating a portal user account, in accordance with an embodiment. As an option, the present method 200 may be carried out in the context of the functionality of FIG. 1. For example, the present method 200 may be carried out utilizing the portal of the multi-tenant on-demand database system described above in the method 100 of FIG. 1. Of course, however, the method 200 may be carried out in any desired environment. The aforementioned definitions may apply during the present description.

As shown in decision 202, it is determined whether a request to create an LPU is received. In one embodiment, the request may be received in response to a user registering with the multi-tenant on-demand database system via a portal. For example, the user may appear to be registering with a service provided by a tenant of the multi-tenant on-demand database system for which the portal is customized by the multi-tenant on-demand database system.

In another embodiment, the request may be received in response to the tenant registering the user with the multi-tenant on-demand database system on behalf of the user. For example, the user may be an existing customer of the tenant, such that the tenant may register the user with the multi-tenant on-demand database system for use in providing the user with access to data objects of the tenant stored by the multi-tenant on-demand database system. To this end, the request may be directly received by the multi-tenant on-demand database system (e.g. from the tenant) or indirectly received by the multi-tenant on-demand database system (e.g. from the user via the portal).

If it is determined that a request to create an LPU is not received, the method 200 continues to wait until such a request is received. Once it is determined that a request to create an LPU is received, an LPU object having a unique LPU identifier is created. Note operation 204. The LTV object may include a predetermined type of object that is configured for registering portal users with the multi-tenant on-demand database system. As noted above, the LPU object has a unique LPU identifier, such as a key for uniquely identifying the LPU object created for the LPU. The LPU object may also include fields for storing login information for the LPU, profile information associated with the LPU, etc.

In one embodiment, the LPU object may be configured based on information provided by the LPU/tenant. In another embodiment, the LPU object may be configured automatically using a default profile.

It is then determined in decision 206 whether the LPU is to be assigned to a contact. The contact may be represented by an existing contact object stored by the multi-tenant on-demand database system or a new contact object not yet stored by the multi-tenant on-demand database system. Thus, the LPU may be assigned to the contact by assigning the LPU object to the contact object (after creation of the contact object if necessary).

The contact object may optionally store information associated with the LPU which is additional to the information included in the LPU object. Accordingly, the contact object may be a different type of object than the LPU object, and may include different fields than the fields of the LPU object for storing different types of information than the LPU object. Just by way of example, the contact object may store contact information associated with the LPU, such as an email address, a telephone number, an address, etc. In this way, the LPU object may have a one-to-one relationship with the contact object.

It should be noted that the determination of whether to create the contact object may optionally be based on the registration performed by the LPU or tenant. For example, if the LPU or tenant enters the contact information for the LPU during the registration, then the contact object may be created and the LPU assigned to the associated contact. Of course, as another option, the contact object may be automatically created based on a rule specified by the tenant associated with the portal via which the LPU is to access to the multi-tenant on-demand database system.

If it is determined that the LPU is to be assigned to a contact, then a contact identifier is stored in the LPU object. Note operation 208. The contact identifier may include a unique identifier of the contact object associated with the LPU. If, however, it is determined that the LPU is not to be assigned to a contact, or once the LPU is assigned to the contact, it is further determined in decision 210 whether the LPU is to be assigned to an account.

In the present embodiment, the account may be represented by an existing account object stored by the multi-tenant on-demand database system or a new account object not yet stored by the multi-tenant on-demand database system. Thus, the LPU may be assigned to the account by assigning the LPU object to the account object (after creation of the account object if necessary).

The account object may optionally store information associated with an account (e.g. portal account) under which the LPU is registering with the multi-tenant on-demand database system. For example, the account may include an account with the tenant of the multi-tenant on-demand database system, and specifically with the portal of the tenant. Accordingly, the account object may store information associated with the LPU which is additional to the information stored by the LPU object and the contact object.

For example, the account object may be a different type of object than the LPU object and the contact object, and may include different fields than the fields of the LPU object and contact object for storing different types of information than the LPU object and contact object. Just by way of example, the account object may store account information associated with the portal. Since the account may be associated with multiple LPUs, the account object may optionally have a one-to-many relationship with LPU objects.

It should be noted that the determination of whether to create the account object may optionally be based on the registration performed by the LPU or tenant. For example, if the LPU or tenant enters the account information for the LPU during the registration, then the account object may be created and the LPU assigned to the associated account. Of course, as another option, the account object may be automatically created based on a rule specified by the tenant associated with the portal via which the LPU is to access to the multi-tenant on-demand database system.

If it is determined that the LPU is to be assigned to an account, then an account identifier is stored in the LPU object. Note operation 212. The account identifier may include a unique identifier of the account object associated with the LPU. If however, it is determined that the LPU is not to be assigned to an account, or once the LPU is assigned to the account, the method 200 terminates. In this way, an LPU object may be created for an LPU and optionally assigned to a contact object and/or account object, during registration of the LPU with the multi-tenant on-demand database system.

In an alternative embodiment (not shown), the association of an LPU with one or more objects, such as an account or a contact, could be mandatory for providing access. Thus, for example, the LPU may be required to be assigned to a contact and an account, in an embodiment. For example, the LPU may be directly associated with the contact, and also automatically associated with the parent account of the contact. In yet another embodiment, another type of object present in the system—other than account or contact—could be used by the designers of the system to make associations between LPUs and data objects for the purpose of configuring data access. In yet another embodiment, administrators of the system could themselves create and designate new objects in the system to be used to configure data access to LPUs.

Table 1 illustrates various examples of LPUs which could be registered using the LPU object. Of course, it should be noted that the examples shown in Table 1 are set forth for illustrative purposes only, and thus should not be construed as limiting in any manner.

TABLE 1

1) users registered with an application store of the multi-tenant on-demand database system;
2) users registered with a service of a tenant of the multi-tenant on-demand database system, e.g. for accessing the multi-tenant on-demand database system for
a) viewing public objects, such as frequently asked questions, self-support diagnostics, user manuals, etc.
b) submitting an open issue (e.g. case or ticket) associated with the service
3) users registered for reading, creating, commenting, voting, etc, on data objects (e.g. ideas, discussion topics, etc.) stored by the multi-tenant on-demand database system, etc.
4) users registered for viewing employee information, such as paid time off available, benefits, etc.

Table 2 illustrates the various internal users who may create and/or utilize the LPU object for various purposes. It should be noted that the portal administrator referenced in Table 2 may include a tenant administrator managing the portal of the tenant. Again, the examples shown in Table 2 are set forth for illustrative purposes only, and thus should not be construed as limiting in any manner.

TABLE 2

| Number | "As a . . ." [user type] | ". . . I want to . . ." [required functionality] | ". . . so that I can [use case]" |
|---|---|---|---|
| 1 | Portal Administrator | create users with the LPU type and profile for my portal | create a portal in which my organization can manage relationships with a very large number of existing and/or potential customers |

TABLE 2-continued

| Number | "As a . . ." [user type] | ". . . I want to . . ." [required functionality] | ". . . so that I can [use case]" |
|---|---|---|---|
| 2 | Portal Administrator | provide access for LPUs to records owned by internal users | allow LPUs to participate in internal processes such as ecommerce and customer service, and in community activities such as voting and commenting on Ideas and discussions |
| 3 | Portal Administrator | provide access for internal users to records owned by LPUs | establish roles and processes by which internal users can manage the activities of LPUs in sales and support business processes, and can act as moderators and experts in community discussions and activities |
| 4 | Portal Administrator | assign LPUs to special portal groups that are mapped to Knowledge Base permissions to Data Dimensions | provide access for those LPUs to the appropriate Knowledge Base Articles |
| 5 | Portal Administrator | manage LPUs through an admin UI | maintain appropriate access to portals when users become inactive, need to be reactivated, and/or need to be deleted |
| 6 | Portal Developer | create new LPUs and associate them with portals through the Metadata API | automate the creation of new portal users in a scalable way through the portal registration process |
| 7 | Portal Developer | assign LPUs to special portal groups mapped to Knowledge Base permissions to Data Dimensions through the Metadata API | automate provision of access for LPUs to the appropriate Knowledge Base Articles in a scalable way through the portal registration process |

Figure 3A:
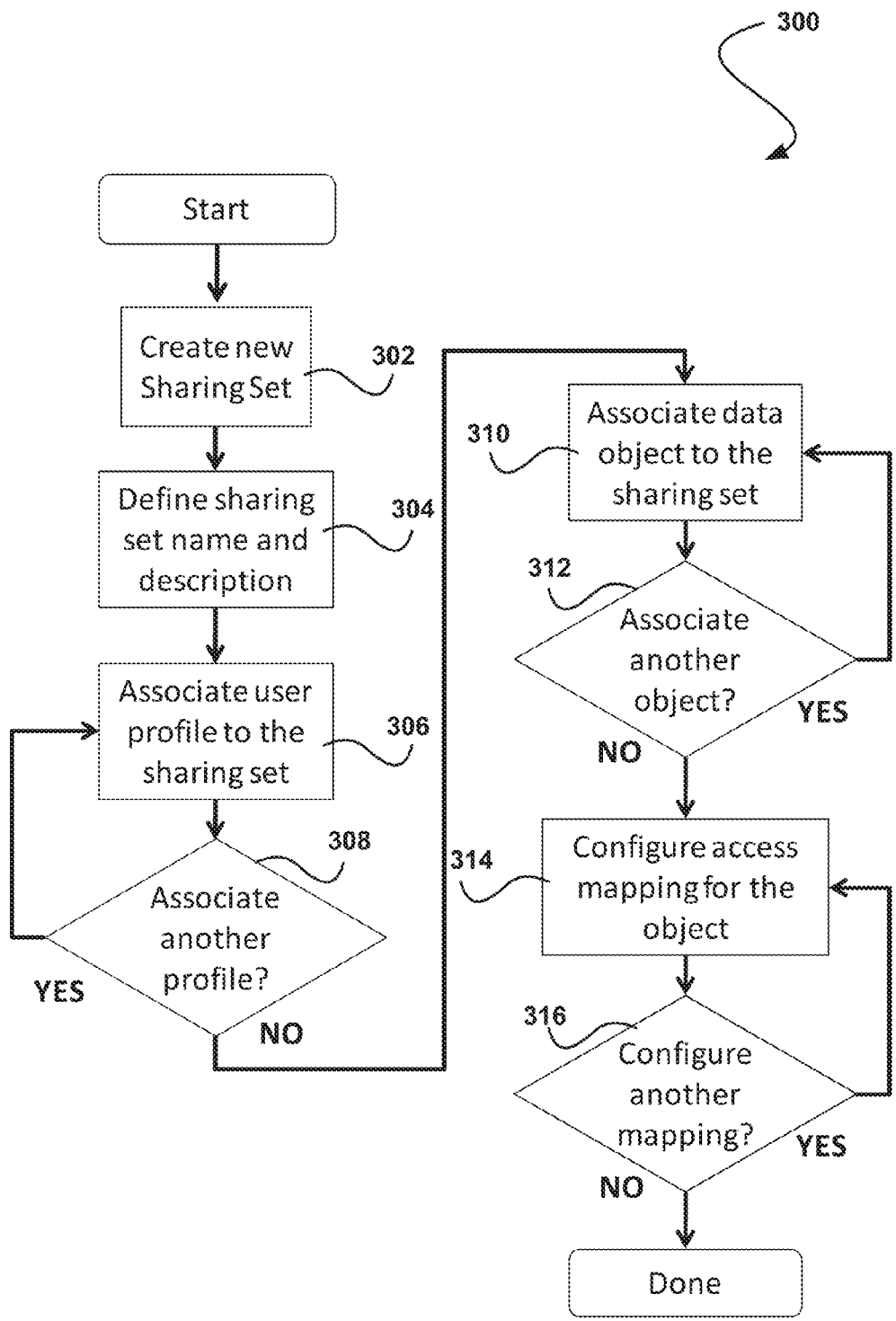
FIG. 3A illustrates a method for configuring object access for portal users, in accordance with an embodiment.

FIG. 3A illustrates a method 300 for configuring object access for portal users, in accordance with an embodiment. As an option, method 300 may be carried out in the context of the functionality of FIGS. 1-2. For example, the method 300 may be provided to a tenant by the multi-tenant on-demand database system. Of course, however, the method 300 may be carried out in any desired environment. Yet again, the aforementioned definitions may apply during the present description.

Figure 3B:
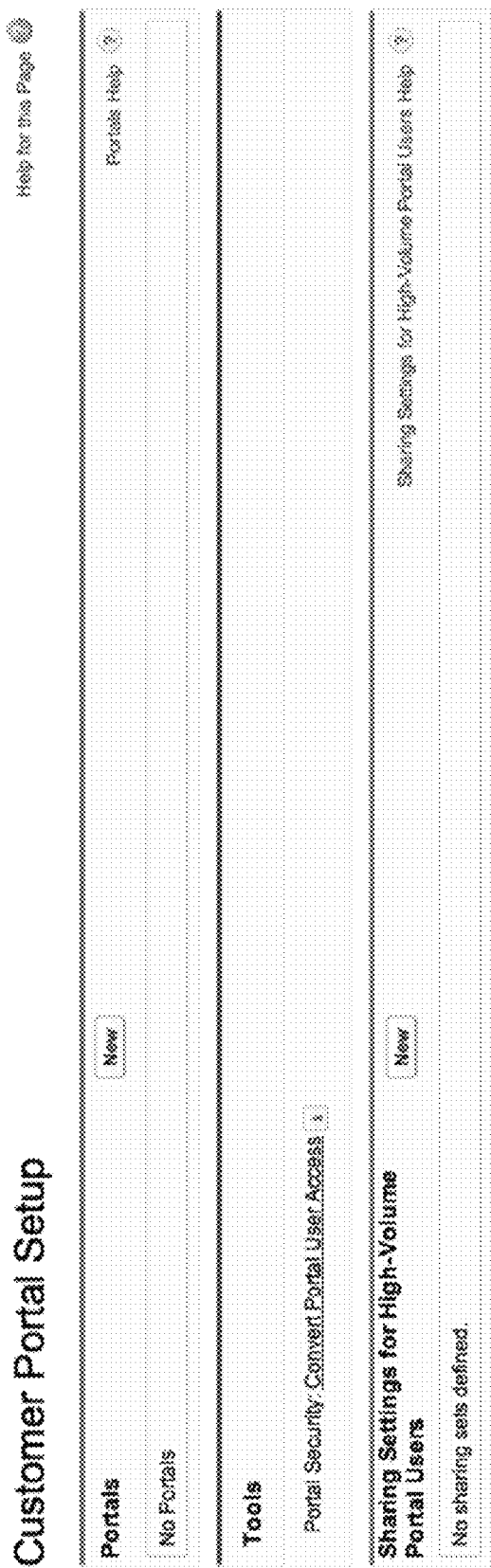
FIG. 3B illustrates a graphical user interface (GUI) for initiating creation of a sharing set to be used in providing object access to portal users, in accordance with FIG. 3A.

As shown in operation 302, a new sharing set is created. The sharing set may include any object capable of being utilized for providing object access to portal users. In one embodiment, the sharing set may be created in response to a user selection to create the new sharing set, as shown in FIG. 3B. Specifically, FIG. 3B illustrates a GUI for initiating creation of a sharing set to be used in providing object access to portal users.

In addition, a name and description are defined for the sharing set created in operation 302. Note operation 304. The name may include a unique identifier for the sharing set which may be used to subsequently access the sharing set (e.g. via the GUI shown in FIG. 3B), such as for modifying the sharing set. The description may include text describing the sharing set. The sharing set name and description may be configured by a user, for example, using the GUI shown in FIG. 3C.

Figures 3C, 3D, 3E, 3F:
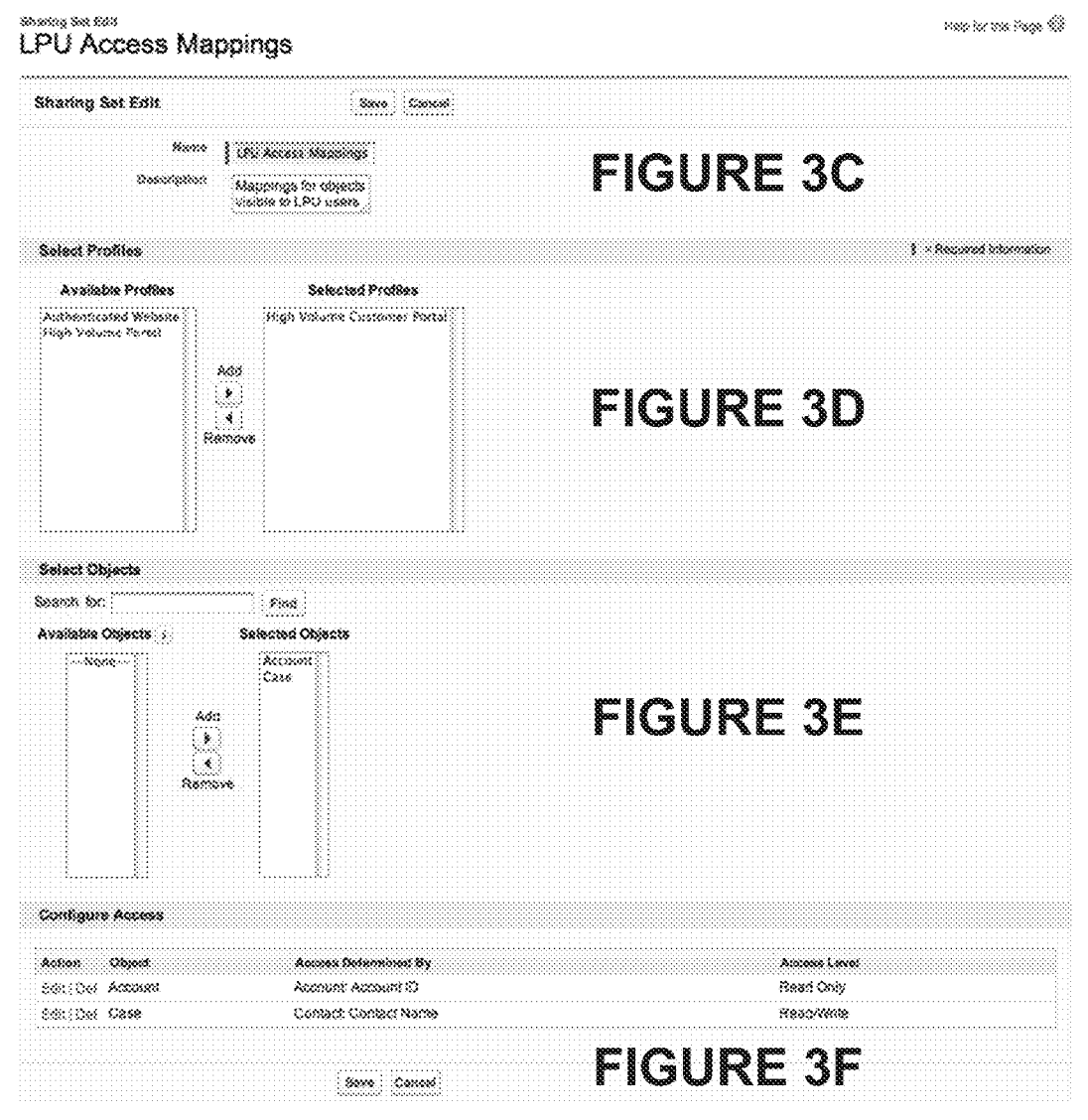

Further, a user profile is associated to the sharing set, as shown in operation 306. In the present embodiment, the user profile may include a profile encompassing all portal users (or at least a subset of all portal users). For example, the user profile may be a group of which portal users are members. FIG. 3D illustrates an exemplary GUI for associating a portal user profile to the sharing set, namely via user selection of the portal user profile.

It is then determined in decision 308 whether another user profile is to be associated to the sharing set. Accordingly, multiple user profiles may optionally be associated with the sharing set. If it is determined that another user profile is to be associated to the sharing set, the method 300 returns to operation 306.

However, if it is determined that another user profile is not to be associated to the sharing set, a data object is associated to the sharing set. Note operation 310. The data object may include any data object to which access to the portal users of the associated portal user profile is to be granted. FIG. 3E illustrates a GUI for associating a data object to the sharing set, for example, by allowing user selection of the data object.

It is then determined in decision 312 whether another data object is to be associated to the sharing set. Thus, multiple data objects may optionally be associated to the sharing set, for allowing the portal users of the associated portal user profile access to such data objects. If it is determined that another data object is to be associated to the sharing set, the method 300 returns to operation 310.

In response to a determination that another data object is not to be associated to the sharing set, an access mapping for each data object associated to the sharing set is configured. Note operation 314. The access mapping may indicate a manner in which access to each data object associated to the sharing set is determined. For example, access to a particular data object may be granted for portal users of the associated portal user profile being associated with a particular account or a particular contact.

Figure 3G:
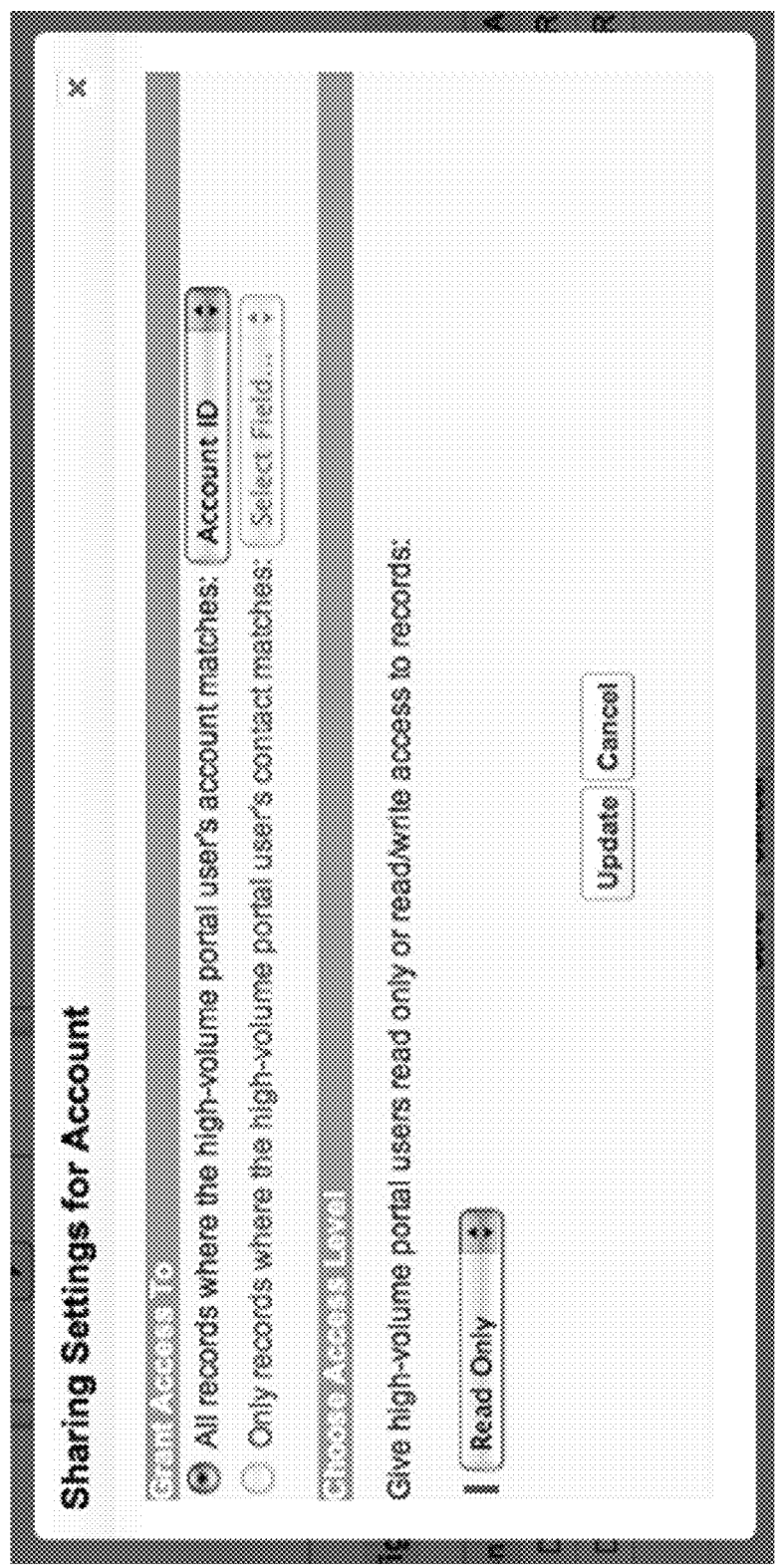
FIG. 3G illustrates a GUI for configuring an access mapping for data objects, in accordance with the method of FIG. 3A.

FIG. 3F illustrates a GUI presenting an access mapping for data objects. The access mapping is presented by showing for each data object associated to the sharing set, a manner in which access to that data object is determined (e.g. via a particular account or a particular contact), and a type of access (access level) granted to that data object. FIG. 3G illustrates a GUI for configuring an access mapping for data objects. As shown in FIG. 3G, a user may select whether access to a data object associated to the sharing set is be granted to portal users of the portal user profile associated to the data set that are associated with (i.e. assigned to) a particular account or a particular contact. As also shown in FIG. 3G, for the selected option to grant access based on account/contact, the user may further select for which particular account/contact associated portal users of the associated portal user profile are to be granted access to the data object. As further shown in FIG. 3G, a level of access to be granted to the aforementioned portal users may be configured, where such level may include read-only, read/write, etc.

To this end, a centralized user interface (e.g. with multiple GUIs) may be provided with the features described in Table 3, for managing LPUs that are members of a portal. It should be noted that the features shown in Table 3 are set forth for illustrative purposes only, and thus should not be construed as limiting in any manner.

Figure 4:
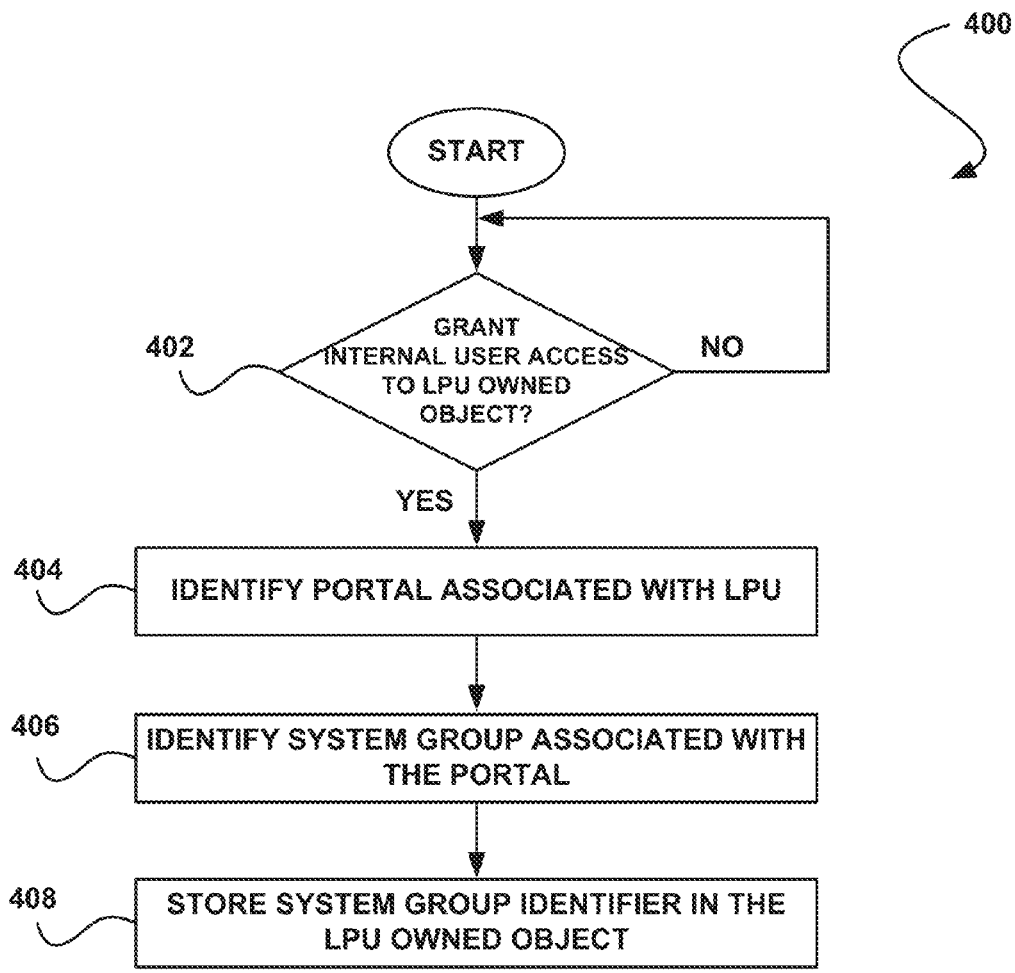
FIG. 4 illustrates a method for binding individual data records owned by portal users to a share group for the purpose of providing internal users access to the data records, in accordance with an embodiment.

TABLE 3 a new page for each portal may allow the portal admin to search through the existing users of the portal, identify a subset of users to manage, and take actions on their membership status
due to the large number of LPUs possibly expected, the minimal requirement for this membership management page may be a list view with full paging and filtering capabilities - the preferred user interface may be task and search based instead of list based and avoid requiring the Portal admin to page through extremely long lists of users
however the Portal Administrator may arrive at the list of users they wish to manage, the UI may also include controls for selecting one or more users and taking action on their membership status, including declaring users inactive, reactivating them if they are already inactive
the ability to create LPUs manually from the UI may be controlled by a new profile permission
Portal Administrators may have the ability to select a "New Light Portal User" button on the list of Portal users
When creating the new user, the Portal Administrator may be restricted to creating users of the Light Portal User type - that is, they may not see any choices for profiles that are not associated with the LPU object type
the Portal Administrator may be able to optionally associate the new LPU with a Portal Account and/or a Contact, in preparation for the visibility model to be configured to LPUs for different objects
the Portal Administrator may be able to inactivate an LPU, and reactive an LPU that is inactive FIG. 4 illustrates a method 400 for binding individual data records owned by portal users to a share group for the purpose of providing internal users access to the data records, in accordance with an embodiment. As an option, the present method 400 may be carried out in the context of the functionality of FIGS. 1-3G. For example, the method 400 may be carried out by the multi-tenant on-demand database system. Of course, however, the method 400 may be carried out in any desired environment. The aforementioned definitions may apply during the present description.

As shown in decision 402, it is determined whether internal user access is to be granted to an LPU owned object. In the present embodiment, an LPU owned object includes a data object to which an LPU is designated as an owner. As an option, the determination may be made by a tenant of a multi-tenant on-demand database system. For example, the determination may be made by an administrator of the tenant, such that the administrator may determine if any internal users of the tenant (or all internal users of the tenant, and thus the tenant itself) are to be granted access to the LPU owned object.

In one embodiment, the determination may be based on a tenant administrator requesting to set permissions for an internal user to have access to the LPU owned object. For example, the GUI 340 of FIG. 3E may be used by the tenant administrator to request that the internal user have access to an LPU owned object, as described above.

If it is determined that internal user access is not to be granted to an LPU owned object, the method 400 continues to wait for an indication that internal user access is not to be granted to an LPU owned object. Once it is determined that internal user access is to be granted to an LPU owned object, a portal associated with the LPU is determined. Note operation 404. In the present embodiment, the portal includes a portal provided by the multi-tenant on-demand database system via which the LPU owning the object accessing the multi-tenant on-demand database system. In one embodiment, the portal may be identified in response to a selection via a GUI of the portal by the tenant administrator (e.g. the GUI 310 of FIG. 3B listing the portals).

A system group associated with the portal is then identified, as shown in operation 406. For example, each portal of a tenant may be associated with a single system group (e.g. via assignment of the system group to the portal). Thus, the system group may be associated with the tenant providing the portal. The system group may optionally be represented by a system group object stored by the multi-tenant on-demand database system. The system group may optionally be automatically identified using a reference between an identifier of the portal and an identifier of the system group.

Furthermore, as shown in operation 408, a system group identifier is stored in the LPU owned object. The system group identifier may include a unique identifier of the system group object, for example. By storing the system group identifier in the owned object, all members of the system group (e.g. as configured via the GUI 340 of FIG. 3E) may be granted access to the LPU owned object. For example, in conjunction with the identification of the system group/portal (operations 404-406), the LPU owned object may also be identified, such that the system group may be assigned to the LPU owned object for specifically granting the members of the system group access to the LPU owned object. In an alternative embodiment, the system group identifier may not necessarily be stored directly in the LPU owned object, but instead may be stored in a separate table referenced by the LPU owned object.

For increased granularity in granting access to only specific members of the system group, a user interface for internal users to the LPU owned record may be built by the tenant associated with the portal. The user interface may allow filtering of which internal users or groups of internal users are allowed access to the LPU object by referring to data on the LPU owned object itself.

As noted above, internal users may be granted access to LPU owned objects through a system group associated with a portal. If the internal users are members of an access group of a portal, they will have full access to all the data owned by the LPUs belonging to that portal. This may be implemented by writing share rows to a corresponding share table, and at run time doing a join between the share table and group membership table.

In such a system, objects may be related to each other in parent-child relationships. For example, one object (the "parent" object) may be associated with 1-n objects of another object type (the "child" objects). When an internal user has access to a child record, the internal user may also gain implicit read access to the parent record. For example, if an internal user has access to a child case, he also has at least read access to the parent account of the case, which may be implemented by writing a share row with full access in a case share table, and writing a share row with read access in an account share table.

An object—such as an account—may be the parent object of other objects that don't have their own sharing model, such as a contract or contact. In this case, the same access rules and settings that apply to the parent object also determine whether a particular user will have access to any of its child objects. Furthermore, when such a child object is owned by an LPU, and made available to internal users of the system through the system group associated with the portal, a share record may be written in the associated share table of the parent object. This share record may designate that all members of the system group associated with the portal will have "full" access to all child objects of the parent object which are owned by LPU users associated with that portal. Full access would allow these internal users to perform any operation on these objects, including reading, editing, deleting and changing the owner of each object. In such a case the system would provide only read access to other child objects of the same parent object, which are not owned by LPUs. This allows administrators of the system to limit the amount of data to which internal users have full access.

In another potential embodiment, the level of access provided to the members of the portal system group could be restricted to a lesser level of permission, such as Read or Edit. In yet another embodiment, the level of access provided by the portal system group could be configurable by an administrative user. In yet another embodiment, the level of access could be configurable by the administrator for each type of object that is shared to internal users through the portal system group.

System Overview

Figure 5:
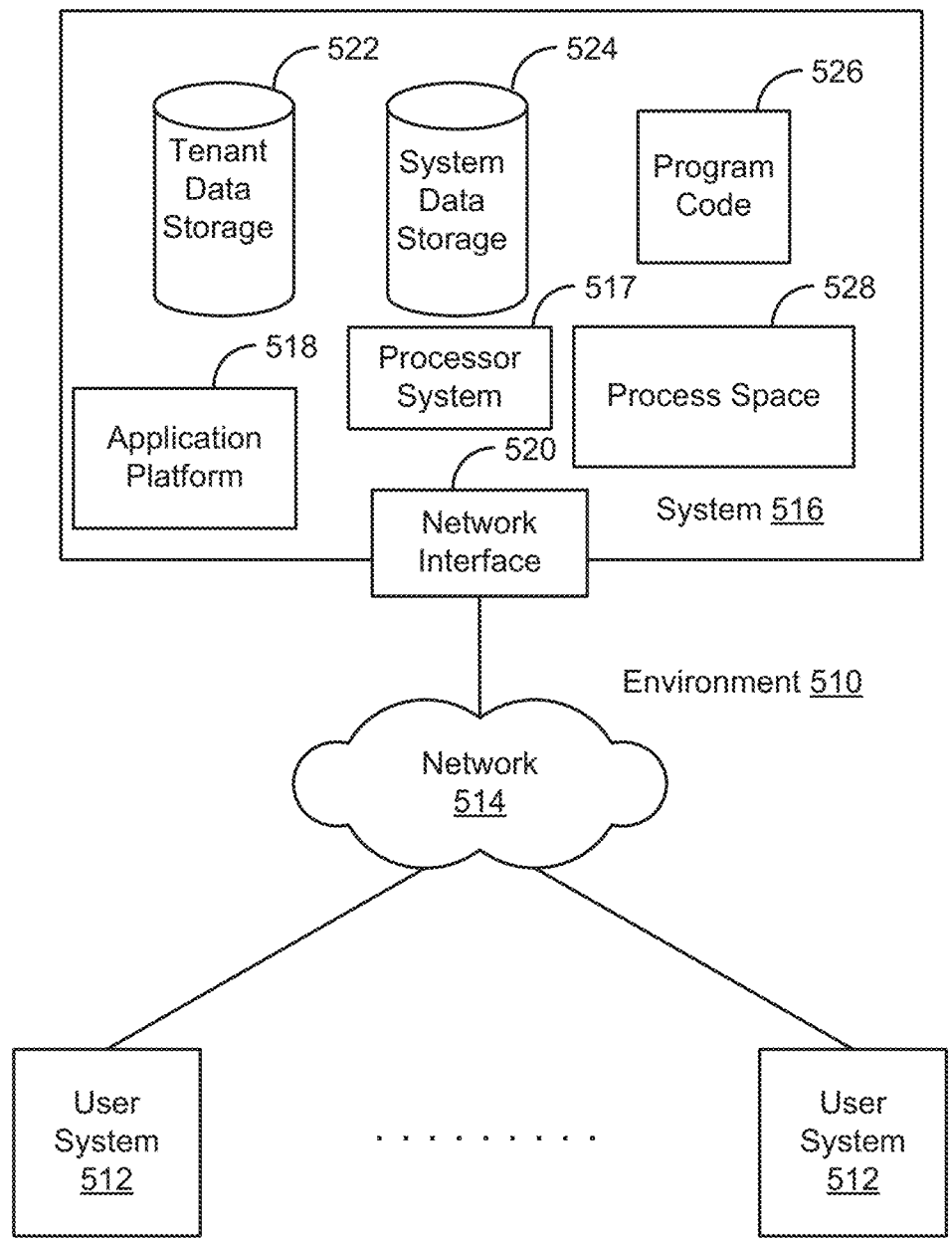
FIG. 5 illustrates a block diagram of an example of an environment wherein an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, hut may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-t)-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AES, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Pentium® processor or the like. Similarly, system 516 (and additional instances of an MTS, where more than one is present) and all of their components might be operator configurable using application(s) including computer code to run using a central processing unit such as processor system 517, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C. C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
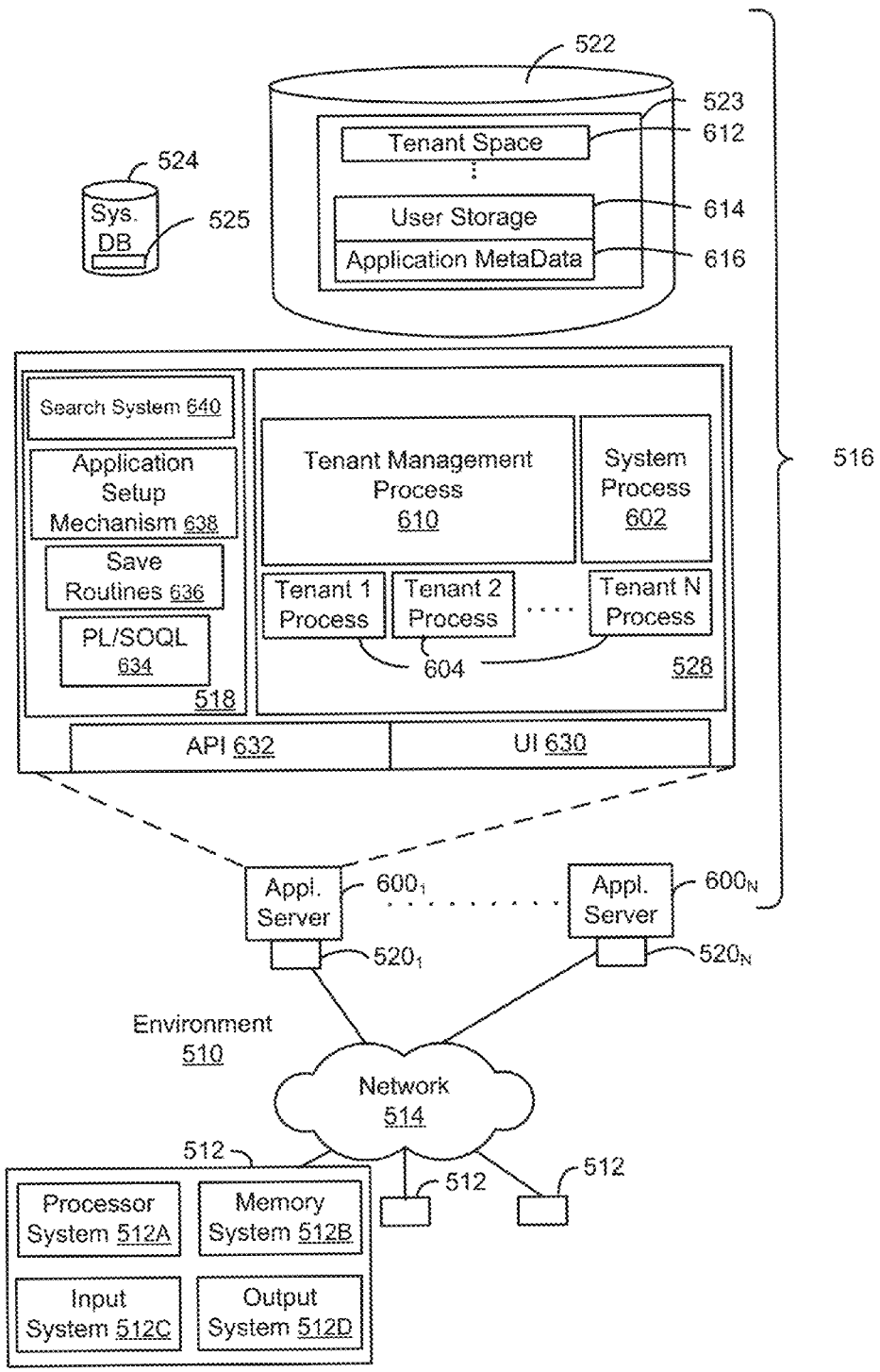
FIG. 6 illustrates a block diagram of an embodiment of elements of FIG. 5 and various possible interconnections between these elements.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer readable storage medium having a computer readable program code embodied therein, the computer readable program code adapted to cause a computer to be executed to implement a method, the method comprising:
providing a platform of a multi-tenant on-demand database system having hardware and software that is shared by multiple tenants of the multi-tenant on-demand database system;
providing, by the multi-tenant on-demand database system, multiple portals wherein each portal includes an interface specific to one of the multiple tenants of the multi-tenant on-demand database system by being branded for the one of the multiple tenants;
receiving, by the multi-tenant on-demand database system, a customization of the interface from the one of the multiple tenants of the multi-tenant on-demand database system;
storing, by the multi-tenant on-demand database system, the customization of the interface for the one of the multiple tenants;
registering a user associated with a tenant with the multi-tenant on-demand database system, wherein the registering is performed via the portal specific to the tenant such that the user appears to register with a service provided by the tenant;
storing a user object associated with the user, wherein the user object stores login information for use in authorizing a login to the portal by the user;
receiving, from the user via the portal, a request for a set of data associated with the multi-tenant on-demand database system;
identifying a data object of the multi-tenant on-demand database system that stores the set of data that is requested by the user;
determining whether the user object is referenced by the data object, wherein the user object is referenced by the data object by storing a unique identifier of the user object in the data object; and
allowing the user to access the data object via the portal in response to determining that the user object is referenced by the data object.

2. The computer program product of claim 1, wherein the portal is a web interface.

3. The computer program product of claim 2, wherein the user indirectly accesses the multi-tenant on-demand database system via the web interface.

4. The computer program product of claim 2, wherein at least one internal user object is stored for use by an internal user of the tenant in directly accessing the multi-tenant on-demand database system.

5. The computer program product of claim 1, wherein the user object is stored by the multi-tenant on-demand database system.

6. The computer program product of claim 1, wherein the user object stores a profile associated with a subscriber.

7. The computer program product of claim 1, wherein the data object is owned by the tenant of the multi-tenant on-demand database system.

8. The computer program product of claim 1, wherein the access includes reading the data object.

9. The computer program product of claim 1, further comprising storing another data object owned by the user.

10. The computer program product of claim 9, further comprising granting the tenant of the multi-tenant on-demand database system access to the other data object owned by the user.

11. The computer program product of claim 10, wherein the access is granted via a reference stored in the other data object to a group associated with the tenant.

12. The computer program product of claim 1, wherein the request for the set of data includes a request for the access to the data object, wherein the request includes a query for the data object.

13. The computer program product of claim 1, wherein the user object is indirectly referenced in the data object.

14. A method, comprising:
providing a platform of a multi-tenant on-demand database system having hardware and software that is shared by multiple tenants of the multi-tenant on-demand database system;

providing, by the multi-tenant on-demand database system, multiple portals wherein each portal includes an interface specific to one of the multiple tenants of the multi-tenant on-demand database system by being branded for the one of the multiple tenants;

receiving, by the multi-tenant on-demand database system, a customization of the interface from the one of the multiple tenants of the multi-tenant on-demand database system;

storing, by the multi-tenant on-demand database system, the customization of the interface for the one of the multiple tenants;

registering a user associated with a tenant with the multi-tenant on-demand database system, wherein the registering is performed via the portal specific to the tenant such that the user appears to register with a service provided by the tenant;

storing a user object associated with the user, wherein the user object stores login information for use in authorizing a login to the portal by the user;

receiving, from the user via the portal, a request for a set of data associated with the multi-tenant on-demand database system;

identifying a data object of the multi-tenant on-demand database system that stores the set of data that is requested by the user;

determining whether the user object is referenced by the data object, wherein the user object is reference by the data object by storing a unique identifier of the user object in the data object; and allowing the user to access the data object via the portal in response to determining that the user object is referenced by the data object.

15. An apparatus, comprising:

a processor executing instructions to perform the steps of:

providing a platform of a multi-tenant on-demand database system having hardware and software that is shared by multiple tenants of the multi-tenant on-demand database system;

providing, by the multi-tenant on-demand database system, multiple portals wherein each portal includes an interface specific to one of the multiple tenants of the multi-tenant on-demand database system by being branded for the one of the multiple tenants;

receiving, by the multi-tenant on-demand database system, a customization of the interface from the one of the multiple tenants of the multi-tenant on-demand database system;

storing, by the multi-tenant on-demand database system, the customization of the interface for the one of the multiple tenants;

registering a user associated with a tenant with the multi-tenant on-demand database system, wherein the registering is performed via the portal specific to the tenant such that the user appears to register with a service provided by the tenant;

storing a user object associated with the user, wherein the user object stores login information for use in authorizing a login to the portal by the user;

receiving, from the user via the portal, a request for a set of data associated with the multi-tenant on-demand database system;

identifying a data object of the multi-tenant on-demand database system that stores the set of data that is requested by the user;

determining whether the user object is referenced by the data object, wherein the user object is reference by the data object by storing a unique identifier of the user object in the data object; and allowing the user to access the data object via the portal in response to determining that the user object is referenced by the data object.

\* \* \* \* \*